(12) United States Patent
Markham

(10) Patent No.: US 7,534,322 B2
(45) Date of Patent: May 19, 2009

(54) METHOD OF DEINKING RECYCLED PAPER EMPLOYING CENTRIFIGAL CLEANERS

(75) Inventor: Larry Derwood Markham, Loveland, OH (US)

(73) Assignee: International Paper Company, Memphis, TN (US)

( * ) Notice: Subject to any disclaimer, the term of this patent is extended or adjusted under 35 U.S.C. 154(b) by 662 days.

(21) Appl. No.: 10/953,090

(22) Filed: Sep. 29, 2004

(65) Prior Publication Data

US 2006/0065376 A1 Mar. 30, 2006

(51) Int. Cl.
*D21B 1/32* (2006.01)
(52) U.S. Cl. ......................................................... 162/4
(58) Field of Classification Search ....................... 162/4
See application file for complete search history.

(56) References Cited

U.S. PATENT DOCUMENTS

| | | | |
|---|---|---|---|
| 3,635,788 A | 1/1972 | Braun et al. | |
| 4,076,578 A | 2/1978 | Puddington et al. | |
| 4,820,379 A | 4/1989 | Darlington | |
| 4,919,754 A | 4/1990 | Mollett et al. | |
| 5,059,280 A | 10/1991 | Thopson et al. | |
| 5,234,543 A | 8/1993 | Markham et al. | |
| 5,259,969 A | 11/1993 | Srivatsa et al. | |
| 5,340,439 A | 8/1994 | Markham et al. | |
| 5,441,601 A | 8/1995 | Cosper et al. | |
| 5,453,159 A | 9/1995 | Markham | |
| 5,512,133 A * | 4/1996 | Markham | 162/4 |
| 5,580,446 A | 12/1996 | Markham | |
| 5,660,684 A * | 8/1997 | Li et al. | 162/5 |
| 5,665,205 A | 9/1997 | Srivatsa et al. | |
| 5,707,488 A | 1/1998 | Markham | |
| 5,733,412 A | 3/1998 | Markham et al. | |
| 5,766,448 A | 6/1998 | Markham | |
| 5,865,947 A | 2/1999 | Markham et al. | |
| 5,876,559 A | 3/1999 | Srivatsa et al. | |

FOREIGN PATENT DOCUMENTS

| | | |
|---|---|---|
| DE | 17 61 233 | 4/1968 |
| EP | 0 570 757 | 9/2000 |

* cited by examiner

*Primary Examiner*—Philip C Tucker
*Assistant Examiner*—Michael J Felton
(74) *Attorney, Agent, or Firm*—Matthew M. Eslami

(57) ABSTRACT

A method of deinking recycled cellulosic paper including the steps of developing a pulp containing paper fibers and bundles of paper fibers in a pulping liquid and an agglomerating agent, subjecting the pulp to a screening treatment, storing the filtrate from the screening treatment, and which includes residual pulping chemicals, in a vessel for a time sufficient to effect a change in the geometry or other characteristic (other than size) of individual ones of the ink particles in the filtrate, and thereafter subjecting the pulp withdrawn from the vessel to a cyclone cleaner treatment to deplete the pulp of modified ink particles and develop a pulp containing paper fibers and substantially fewer ink particles relative to the quantity of ink particles present in the screen filtrate, and collecting the pulp of depleted ink particle content for use in a papermaking operation.

10 Claims, No Drawings

METHOD OF DEINKING RECYCLED PAPER EMPLOYING CENTRIFUGAL CLEANERS

CROSS-REFERENCE TO RELATED APPLICATIONS

Not Applicable

STATEMENT REGARDING FEDERALLY SPONSORED RESEARCH OR DEVELOPMENT

Not Applicable

FIELD OF INVENTION

This invention relates to deinking of recycled cellulosic paper and specifically to methods for separation of ink particles from cellulosic fibers and removal of the separated ink particles from a slurry of fibers and separated ink particles.

BACKGROUND OF INVENTION

Recycling of cellulosic paper is a major activity in the papermaking industry. In certain waste paper, such as "office waste", a major problem associated with the recycling process is the separation of paper fibers or small clumps of paper fibers from ink particles which have been dislodged from the recycled paper. Office papers or "office waste" are terms used at times to designate paper waste which originates in business offices or the like. Office waste often includes relatively large quantities of ink from sources such as toners and the like employed in copying machines, computer printers, and other means by which ink is physically applied onto cellulosic paper.

Commonly the ink is in the form of black or other colored particulates and once applied to a paper, the particulates are strongly bonded (at times "fused") to the paper fibers. Thus, the initial effort toward recycling a printed paper is to dislodge the ink particulates from the paper fibers. In paper recycling activities, this is commonly accomplished by disintegrating the printed paper into very small pieces which are either simultaneously or subsequently converted to a pulp which contains a pulping liquid, fibers and small bunches of fibers, and dislodged ink particles. The dislodged ink particles may be larger or smaller than individual ones of the paper fibers.

In some cases, an agglomerating chemical is added to the pulp to consolidate smaller ink particles into larger ink particles. The pulp, so treated, is thereafter subjected to screening wherein the fibers, and smaller ink particles are passed through the screen along with the carrier liquid. The filtrate from the screening, containing fibers and small ink particulates is thereafter subjected to treatment employing a cyclone cleaner wherein small ink particulates are separated from the fibers to develop an output stream of carrier liquid and fibers, some of which retain ink particles attached thereto. This output stream contains a slurry of fibers and small ink particles.

Rejects from the screen include larger fiber bundles, various contaminants such as plastic, ink particles which do not pass through the screen openings, and ink remaining associated with the fibers in the fiber bundles.

U.S. Pat. No. 5,512,133, the entire content of which is incorporated herein by reference, provides a description of the deinking art, including a definition of "ink", sources of ink-bearing recycled paper, prior art methodology for deinking the paper, and a deinking method which employs agglomeration agents, screening, cyclone cleaning and flotation steps.

U.S. Pat. No. 3,635,788, the entire content of which is incorporated herein by reference, provides a description of the use of cyclone centrifuges in the deinking of recycled paper stock.

From the foregoing it will be recognized that conventional deinking systems use many stages of pulp treatment to improve the quality and cleanliness of the pulp, including stages using equipment for screening, centrifugal cleaning, flotation, washing, pressing, dispersion, and bleaching. In the instance of the flotation stage, pre-dispersion of the ink in a high consistency disperser is usually required to thoroughly detach the ink from the fiber and to break it down into fine specks which can be successfully removed by the flotation stage. The dispersion operation involves thickening the pulp to 25-35% consistency, then heating it with steam and then dispersing it in a refiner type device. The pulp consistency is then reduced to about 1% for ink removal in the flotation stage.

Dispersion followed by flotation has a high capital cost for the large equipment as well as a large space requirement in the deinking plant. It also involves high operation cost because of substantial fiber loss in the thickening and flotation stages, high usage of horsepower and steam and equipment maintenance expenses. Nevertheless, dispersion/flotation is commonly used because it is very effective for improving the cleanliness of the deinked pulp. Most modern deinking systems operating on office waste actually use dispersion/flotation at two separate points in the deinking system to achieve adequate pulp cleanliness. Clearly, this duplicate arrangement has a particularly high capital cost and a high operation cost.

Dispersion followed by flotation can also be added to an agglomeration deinking process to improve the ink speck removal. It thus becomes evident that there is needed an alternative method for deinking recycled fibrous paper using the agglomeration system without using the dispersion/flotation concepts.

SUMMARY OF INVENTION

In the present application, the term "dirt" includes ink and "stickies" and any other types of contaminants which are visible as dark colored specks in a paper sheet formed from the recycled paper pulp.

In accordance with one aspect of the present invention, there is provided a method of deinking recycled cellulosic paper including the steps of developing a pulp containing paper fibers and bundles of paper fibers in a pulping liquid and an agglomerating agent, subjecting the pulp to a screening treatment, storing the filtrate from the screening treatment, and which includes residual pulping chemicals and/or agglomeration agent, in a vessel for a time sufficient to effect a change in the geometry or other characteristics (other than size) of individual ones of the ink particles in the filtrate, and thereafter subjecting the pulp withdrawn from the vessel to a cyclone cleaner treatment to deplete the pulp of modified and other ink particles and develop a pulp containing paper fibers and substantially fewer ink particles relative to the quantity of ink particles present in the screen filtrate, and collecting the pulp of depleted ink particle content for use in a papermaking operation. In the present invention, such modification of the ink particles is accomplished free of external additives, such as chemicals, and without requiring agitation of the stored pulp.

In accordance with a further aspect of the present invention, the present inventors employ cyclone cleaners having a diameter of less than 5 inches, and preferably cyclone cleaners having a diameter of about 3 inches.

DETAILED DESCRIPTION OF INVENTION

In the method of the present invention, a quantity of recycled paper, such as office waste, is admitted to a pulper, along with a conventional pulping liquid and an agglomeration agent, all as is well known in the art. Within the pulper, the ink particles are dislodged from the cellulosic fibers of the paper and the paper is dissociated into fibers and clumps of fibers, some of which may include residual ink particles. Conventional operating parameters of the pulping process may be employed.

Following the pulp formation/ink agglomeration operation, the resultant pulp is screened employing a conventional screen, operating at conventional operational parameters.

In accordance with one aspect of the present invention, those fiber clumps and ink agglomerates which are retained on the screen are removed and conveyed to any of several locations for remote storage, recovery operations, reintroduction into a subsequent pulping operation, etc. The filtrate from the screen comprises fibers, possibly some small fiber clumps, and ink particles which have passed through the screen. Some of the fibers or fiber clumps may include ink particles which remain attached to the fibers. Suitable screens for use in the present method are screens having slot-type openings through the screen. Slots having a width of between about 0.004 inch and 0.006 inch have been found suitable for separation of cellulosic fibers derived from recycled office waste. Cellulosic fibers from other sources of recycled ink-bearing paper may be processed employing like pulping and screening operations. Following the screening, the pulp can be further cleaned using centrifugal cleaning or using multiple stages of centrifugal cleaning in series. It is desired to produce a pulp having a TAPPI dirt count of less than 200 ppm, and preferably less than 100 ppm, after these stages of screening and centrifugal cleaning.

In the method of the present invention, the filtrate from the screening or centrifugal cleaning operation is conveyed to a storage vessel, such as a tower of the type commonly employed in pulping operations. During storage of the filtrate within the storage vessel, the individual ink particles disposed in the filtrate are exposed to any residual pulping chemicals, any residual agglomeration agent in the pulp, or the like. However, it has further been found that there is no material agglomeration of such individual ink particles disposed in the stored filtrate. This factor has been confirmed through examination of the physical size of the individual ink particles upon their entry into the storage vessel and after their residence time within the storage vessel. On the contrary, it has been found that the individual ink particles under go at least a geometrical change, specifically taking on a more spheroidal geometry during their residence within the storage vessel. Whereas it is not known with certainty, it is believed that during the residence of the pulp in the storage vessel there may be some weakening of the bonds (physical or chemical) between the ink particles which remain attached to the paper fibers with resultant separation of such ink particles from their fiber host. Irrespective of what may be the mechanism, the present invention has found that the morphology of those ink particles which have already been separated from their host fibers(s) and/or ink particles which become loosened from their host fibers during their residence in the storage vessel, appears to be advantageously altered as evidenced by the enhancement of their removal from the pulp in the course of cyclone separator processing of the pulp post storage.

Storage periods of the filtrate in the storage vessel may vary from about 30 minutes to about 24 hours. Lesser residence times within the storage vessel do not appear to be effective in enhancing the subsequent treatment of the filtrate, while residence times longer that about 24 hours do not appear to be necessary to achieve the enhanced reduction in dirt count of the pulp obtained by the present method, and in any event, such longer residence times tend to provide unacceptable cost to benefits ratios. No agitation of the pulp within the storage vessel is necessary.

At the end of the desired storage period, the filtrate is fed into and through a cyclone separator wherein the fibers are separated from the ink particles by centrifugal action. In practice, based upon the design flow rate of the pulp from the storage vessel, among other factors, there may be employed multiple, even hundreds of the cyclone separators operating in parallel.

Reference is made to U.S. Pat. No. 3,635,788 for a description of a suitable cyclone separator and its method of operation. Basically, in the present invention, pulp fed from the storage tower is fed from the tower into the cyclone separator (s) wherein solids (predominantly dirt and ink particles) migrate toward an outer downwardly spiraling vortex and are educated via the bottom of the separator vessel. The remainder of the pulp slurry from the internal vortex of the separator, containing whatever solids (fibers) have remained therein is exhausted through a top nozzle, all as is well known in the art.

In accordance with one aspect of the present invention, each of the cyclone separators employed is of a maximum diameter of less than 5 inches, and preferably of a maximum diameter of about 3 inches. It has been found that the smaller diameter separators exhibit g-forces several times greater than the g-forces of the larger separators, thereby providing for enhanced separation efficiency of the separators.

Irrespective of such enhanced efficiency of the separator, per se, the present inventor has found that when processing pulp containing recycled ink-bearing paper stock, the efficiency of cleaning of the ink, as measured by the TAPPI dirt count, is markedly increased when the same pulp is stored in a storage vessel, under quiescent conditions, for a time period of between about 30 minutes to about 24 hours, as opposed to processing the pulp directly from a screening operation or from other cyclone cleaning operations to the cyclone separation operation. As noted, this efficiency enhancement is believed to be a function of the time exposure of those individual ink particles which have been theretofore freed from their paper fiber host to the processing chemicals associated with the deinking process and which remain in the pulp, and/or to some other unknown factor such as swelling of paper fibers, weakening of the bonds (physical and/or chemical) of those ink particles which continue to be bonded to their paper fiber host after the screening and cleaning operation and which continue into the storage vessel, or some combination of these and/or other factors. Irrespective of the mechanism(s) occurring within the storage vessel, it has been visually confirmed that the geometry of individual ones of the ink particles exiting the storage vessel and directing into the separator(s) do not exhibit any material size change as a consequence of their residence time in the storage vessel. No agglomeration of ink particles during residence of the pulp within the storage vessel has been noted.

EXAMPLE I

Deinked pulp was obtained from a commercial agglomeration deinking plant which used office waste as the raw material. The plant used 0.004" slotted screens and centrifugal cleaners in the processing stages. The first set of centrifugal cleaners was 6" in diameter and had an efficiency of 85% dirt removal. The second set of centrifugal cleaners was 2.5" in diameter and had an efficiency of 70% dirt removal. The third set of centrifugal cleaners was 2.5" in diameter and had an efficiency of 55% dirt removal. The deinked pulp was then stored in a storage tower for 2 hours and then processed through a 3" diameter centrifugal cleaner. The dirt count in the pulp before cleaning was 28.4 ppm. The cleaner was a Black Clawson Ultra-Clone cleaner operated at a pressure drop of 31 psi and at a hydraulic reject rate of 4.7%. The consistency of the pulp fed to the cleaner was 0.99%, and the pulp accepted by the cleaner had a consistency of 0.81%. The pulp accepted by the cleaner had a dirt count of 4.2 ppm. The dirt removal efficiency obtained from the cleaner was 85%. This extremely high dirt removal efficiency produced a pulp having sufficiently low dirt count to be used for high quality printing and writing papers.

EXAMPLE II

Deinked pulp was obtained from an agglomeration deinking plant which used 0.006" slotted screens and 2 stages in series of centrifugal cleaners in the processing stages. The first set of centrifugal cleaners was 6" in diameter, and the second set was 2.5" in diameter. The deinked pulp was stored for 6 hours and then further processed by cleaning using a 2.5" diameter centrifugal cleaner. The dirt count in the pulp before cleaning was 79 ppm. The cleaner was operated at a pressure drop of 18 psi and with a hydraulic reject rate of 4%. The pulp accepted by the cleaner had a dirt count of 9 ppm. The dirt removal efficiency was 89%.

EXAMPLE III

Deinked pulp was obtained from the same agglomeration deinking plant as in Example II. The deinked pulp was then processed using the same storage and cleaning method as in Example II except that the cleaner was operated at a pressure drop of 21 psi and at a hydraulic reject rate of 8%. The dirt count in the pulp before cleaning was 86 ppm, and the dirt count after cleaning was 18 ppm. The dirt removal efficiency in the cleaner was 79%.

EXAMPLE IV

Deinked pulp was obtained from an agglomeration deinking plant which used 0.004" slotted screening and 3 stages in series of centrifugal cleaning in the processing stages. The pulp was stored for 3 hours and then processed using a 2.5" diameter centrifugal cleaner at a pressure drop of 18 psi and at a hydraulic reject rate of 6%. The dirt count of the pulp feeding the cleaner was 15 ppm, and the dirt count of the pulp accepted by the cleaner was 0 ppm. The efficiency of dirt removal from processing in the centrifugal cleaner was 100%.

EXAMPLE V

Deinked pulp was obtained from the same agglomeration deinking plant as in Example IV. The pulp was processed using the same storage and cleaning method as in Example IV except that the hydraulic reject rate from the cleaner was 4%. The dirt count was reduced from 15 ppm down to 1 ppm by processing through the cleaner, for a dirt removal efficiency of 93%.

As noted in the Examples given above, conventional pulping apparatus and processing parameters may be employed in developing the pulp, including agglomeration of ink particles. Further, conventional pulp screens and operating parameters may be employed, subject to the slot size limitations recited hereinabove. Whereas a particular cyclone separator has been named in the Examples, it will be understood that other commercial brands of cyclone separators suitable for achieving the operating conditions of the present method are available, as desired.

In the above examples, the agglomeration agent was a mixture of one or more of C5-C20 alkanols and nonionic surfactants known in the art. The amount of surfactant employed was between 0.3% and 0.5% of the weight of the dry fiber at the start of pulping.

In the present invention, the pulp may be stored in the storage vessel at any common consistency, for example commonly the storage consistency is between about 5% and 30%, and preferably between about 10% and 15%. Consistencies of pulp below about 5% require inordinately larger storage vessels for a given volume of pulp. Pulp consistencies above about 30% require special equipment for handling.

Storage of the filtrate from the screening operation of the present invention may be in a tower of the type commonly employed in pulp-preparation process equipment. As examples, in Examples I, IV and V above, the storage vessel was a tower 75 feet in height and 30 feet in diameter. In Examples, II and III above, the tower was 90 feet in height and 35 feet in diameter.

What is claimed:

1. A method of deinking recycled cellulosic fibers having ink associated therewith comprising the steps of:
   a. producing a pulp from the recycled cellulosic fibers, said pulp comprising cellulosic fibers, ink particles and an agglomeration agent,
   b. after producing said pulp, subjecting said pulp to a screening and two or three cyclonic cleaning treatments which develops a filtrate including paper fibers and ink particulates having a Tappi dirt count of less than 200 ppm,
   c. after said subjecting step, storing said filtrate in a vessel for a period of time ranging from about ½ hour to about 24 hours to alter the geometry of ink particles in said filtrate, and;
   d. directly after the storing step, withdrawing said filtrate from said vessel and transferring said filtrate to one more cyclonic cleaning treatment wherein said filtrate is depleted of ink particles to produce a useful papermaking pulp.

2. The method of claim 1 wherein said step of subjecting said pulp to a screening treatment includes depositing said pulp onto a screen having a plurality of openings there through, said openings being of a size adequate to permit the passage there through of paper fibers and ink particles of a size approximating the size of said paper fibers, to develop a filtrate containing paper fibers and ink particulates.

3. The method of claim 2 wherein each of said plurality of openings through said screen comprises a slot of width not greater than about 0.006 inch.

4. The method of claim 2 wherein said filtrate is collected and stored in a vessel for a period of time ranging from about 1 hour to about 6 hours to effect alteration of the geometry of individual ones of said ink panicles.

5. The method of claim 4 wherein said ink particles exhibit essentially no change in the size of individual ones of said ink particles during the course of residence of said filtrate in said vessel.

6. The method of claim 1 wherein said step of withdrawing said filtrate to the cyclonic cleaning treatment includes processing said filtrate through a cyclone cleaner having a diameter not greater than about 3 inches.

7. The method of claim 1 wherein step d exhibits a cleaning efficiency of 79% or greater.

8. The method of claim 1 wherein said pulp exhibits a TAPPI dirt count between zero and about 18 ppm after storage and after the one more cyclonic treatment.

9. The method of claim 1 wherein the residence time of said filtrate within said vessel is from about 1 hour to about 4 hours.

10. The method of claim 1 wherein said filtrate exhibits a consistency of between about 5% and 15% based on the weight of dry fiber in the filtrate upon introduction of said filtrate to said vessel.

* * * * *